US006996050B2

(12) United States Patent
Nakamura et al.

(10) Patent No.: US 6,996,050 B2
(45) Date of Patent: Feb. 7, 2006

(54) OPTICAL PICKUP APPARATUS FOR READING AND RECORDING INFORMATION ON RECORDING MEDIUM

(75) Inventors: Mizuki Nakamura, Iwata-gun (JP); Atsushi Kitamura, Iwata-gun (JP); Kozo Matsumoto, Iwata-gun (JP); Motoji Egawa, Iwata-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 595 days.

(21) Appl. No.: 10/241,550

(22) Filed: Sep. 12, 2002

(65) Prior Publication Data

US 2003/0053398 A1 Mar. 20, 2003

(30) Foreign Application Priority Data

Sep. 20, 2001 (JP) ............................ 2001-287342

(51) Int. Cl.
*G11B 7/00* (2006.01)

(52) U.S. Cl. ............................ 369/112.01; 369/112.02

(58) Field of Classification Search ........... 369/112.01, 369/112.1, 112.16, 44.23, 44.24, 112.28, 369/110.02, 110.04, 112.02
See application file for complete search history.

(56) References Cited

U.S. PATENT DOCUMENTS 5,594,713 A * 1/1997 Komma et al. .......... 369/44.23
5,600,614 A * 2/1997 Katayama ................ 369/44.23

FOREIGN PATENT DOCUMENTS

JP 2002-203334 A 7/2002

OTHER PUBLICATIONS

"Optical and Electro-Optical Engineering Contact", vol. 33, No. 11 (1995), no month or day.

* cited by examiner

*Primary Examiner*—Nabil Hindi
(74) *Attorney, Agent, or Firm*—Oliff & Berridge, PLC

(57) ABSTRACT

A laser beam emitted from a laser diode and having a wavelength of 780 nm is S-polarized. A polarization plane rotating means (λ/4 phase plate) is disposed between a super-resolution cut-off filter comprising a polarizing filter film and an objective lens. When reading on DVD, the objective lens, the polarization plane rotating means and the super-resolution cut-off filter in combination are set to the optical path. The S-polarized laser beam is focused to a micro spot diameter by super-resolution effects by the super-resolution cut-off filter together with the objective lens. Also, the S-polarized laser beam reflected at a disk and traveling backward along the incoming optical path is converted into a P-polarized laser beam while passing backward through the polarization plane rotating means. The P-polarized laser beam passes through the super-resolution cut-off filter without loss is received by a photo-detector.

5 Claims, 7 Drawing Sheets

OPTICAL PICKUP APPARATUS FOR READING AND RECORDING INFORMATION ON RECORDING MEDIUM

BACKGROUND OF THE INVENTION

1. Field of the Invention

The present invention relates to an optical pickup apparatus for reading and recording information on a recording medium (hereinafter referred to as "optical pickup apparatus" or "apparatus" as appropriate), more particularly to an optical pickup apparatus suffering reduced loss of reflected laser beam from a recording medium.

2. Description of the Related Art

Currently, in optical pickup apparatuses using light, such as a CD (compact disk) drive, information is read out in such a manner that a recording pit is produced by converging a laser beam emitted from a laser beam source, as micro spot, onto a track provided on a disk-like recording medium such as a CD, presence or absence of the pit is recorded as information, the micro spot is radiated on the track, and that the presence or absence of the pit on the track is detected by a reflected laser beam.

Recently, DVDs (digital versatile disks) having a recording capacity about 7 times as large as that of CDs have been widely used to meet the demand for increased recording capacity. Increase in recording capacity means improvement of the recording density, which depends upon the number of recording pits formed on a disk-like recording medium (hereinafter referred to as disk). In DVDs, decreasing the size of a recording pit, that is, decreasing the diameter of a laser beam spot on the disk is one key way for increasing the density. The size of the micro spot to be radiated on the disk is proportional to the wavelength of a laser beam and is inversely proportional to the numerical aperture of an objective lens. Accordingly, for decreasing the size of the recording pit, it is required to shorten the wavelength of the laser beam and/or to increase the numerical aperture of the objective lens.

However, DVDs are strongly required to be compatible with CDs from the viewpoint of backward comparability of software. Originally, an optical pickup apparatus was provided with one laser beam source for a laser beam with a wavelength of 635–650 nm and one objective lens having a numerical aperture of about 0.6 for DVDs, and also with another laser beam source for another laser beam with a wavelength of 780 nm and another objective lens having a numerical aperture of about 0.45 for CDs, thereby ensuring the compatibility between the both disks.

However, when the numerical aperture of the objective lens is increased, the convergence state of the laser beam deteriorates due to coma aberration with respect to the inclination of the optical disk. Since coma aberration is proportional to the third power of the numerical aperture of the objective lens and to the thickness of the disk substrate, DVDs are designed to have a disk substrate thickness of 0.6 mm, which is half that of CDs.

When the thickness of the substrate deviates from the prescribed value, spherical aberration occurs at a convergence position of light passing through the inward portion of the objective lens and a convergence position of light passing through the outward portion thereof. Therefore, when a CD is read using an objective lens having a numerical aperture of 0.6 optimized to the thickness of the DVD substrate, the spherical aberration must be corrected by limiting the outward portion of luminous flux incident on the lens or by slightly diverging the incident angle at the lens.

Thus, one objective lens adapted for the DVD may work compatibly for the CD with the necessary correction of spherical aberration, but two laser beam sources for laser beams with the above-mentioned respective different wavelengths have to be provided for compatibility with a write-once-read-many CD because the reflective recording layer of the CD is formed of an organic dye material and has a reflection coefficient as low as 6% for a laser beam having a wavelength of 635–650 nm appropriate to the DVD.

FIG. 5 is a block diagram of a first example of a conventional optical pickup apparatus. The first example includes laser beam sources 91 and 12 to emit laser beams with a wavelength of 650 nm for DVDs and a wavelength of 780 nm for CDs, respectively, and a wavelength selection prism 92 for reflecting/transmitting and making the respective laser beams travel along the same optical path. There is also provided a half mirror 11 for reflecting and guiding the laser beam to a collimating lens 13 and also for transmitting and guiding a reflected laser beam returning from a disk 18 to a photo-detector 90. The laser beam that has passed through the collimating lens 13 is reflected and guided by a reflecting mirror 15 to an objective lens 16 or 17, and then incident on the disk 18. The disk 18, either a DVD 18*a* or a CD 18*b*, is placed on a driving mechanism (not shown) and rotated thereby.

The objective lens 16 has a high numerical aperture (high NA) for DVD, and the objective lens 17 has a low numerical aperture (low NA) for CD. The two objective lenses can be switched over interchangeably for the DVD and the CD by a driving mechanism (not shown). The laser beam reflected at the disk 18 travels backward along the incoming path, passes through the half mirror 11, is received by the photo-detector 90, and converted thereby into an electrical signal.

FIGS. 6A to 6C are explanatory drawings of the wavelength selection prism 92. The wavelength selection prism 92 is provided with an optical path control film 80 having characteristics shown in FIG. 6C. The optical path control film 80 blocks a laser beam with a wavelength of 700 nm or less and transmits a laser beam with a wavelength of 750 nm or more. Accordingly, a laser beam 81 with a wavelength of 780 nm is not blocked by the optical path control film 80, and so travels straight therethrough as shown in FIG. 6A. A laser beam 82 with a wavelength of 650 nm from a direction perpendicular to the laser beam 81 is blocked and reflected by 90 degrees by the optical path control film 80, and takes the same optical path as the laser beam 81 with a wavelength of 780 nm as shown in FIG. 6B.

The apparatus shown in FIG. 5 operates as follows. A laser diode (wavelength: 650 nm) 91 for DVDs and another laser diode (wavelength: 780 nm) 12 for CDs, as light sources, are disposed orthogonal to each other so that respective laser beams emitted therefrom are guided into the same optical path by the wavelength selection prism 92. Then, the laser beam has its optical axis reflected by 90 degrees at the half mirror 11, and is converted into a parallel pencil by the collimating lens 13. The laser beam collimated is directed by the reflection mirror 15 toward the disk 18 with a recording layer, and is incident on an objective lens appropriately selected out of the objective lens 16 with a high NA for DVDs and the objective lens 17 with a low NA for CDs and switched over to be set in place by the drive mechanism (not shown). Specifically, when reading a DVD, the laser diode 91 for DVDs oscillates, and the objective lens 16 is set at the optical path to converge the laser beam onto the disk (DVD) 18*a*, and when reading a CD, the laser diode 12 for CDs oscillates and the objective lens 17 is set at the optical path to converge the laser beam onto the disk (CD)

18*b*. The above-described switching-over mechanism is incorporated into an axially-sliding-type actuator (not shown). The laser beam reflected at any of the disks starts traveling in the backward direction along the incoming path, passes through the half mirror 11, is incident on the photo-detector 90, and converted thereby into an electrical signal.

The apparatus of the first conventional example has the following disadvantage. In order to ensure compatibility among a DVD, a CD and a CD-R/RW (CD recordable/rewritable), two laser diodes having wavelengths different from each other are required, and a means for guiding two laser beams into the same optical path is additionally required.

In order to overcome the above disadvantage, the present inventors disclosed "Optical Pickup Apparatus for Reading and Recording Information on Recording Medium" in Japanese Patent Laid-open No. 2002-203334 (JP 2002-203334A). The apparatus, which is shown in FIG. 8 as a second conventional example, includes only one laser diode, and a super-resolution cut-off filter disposed immediately before one of two objective lenses, and is adapted to compatibly read and record information on two types of disks having respective recording densities different from each other.

The super-resolution cut-off filter is an optical filter for coherent light, realized using an art called super-resolution. Since the super-resolution is a well-known art which is described in detail in, for example, "Optical and Electro-Optical Engineering Contact", Vol. 33, No. 11 (1995), a description thereof will be omitted.

The resolution of optical equipment is related to the diameter of a laser beam spot converged by an objective lens. As is well known, a formula of $W=1.22\lambda/NA$ is valid, where W is the diameter of the main lobe of a convergent spot in paraxial approximation, $\lambda$ is the wavelength of a laser beam, and NA is the numerical aperture. Accordingly, the wavelength $\lambda$ has to be small and the numerical aperture NA has to be large in order to decrease the diameter W of the main lobe, that is, to obtain high resolution.

FIGS. 7A to 7D explain the relation between the configuration of the super-resolution cut-off filter and the diameter of the main lobe of a converged laser spot, in which FIGS. 7A and 7C show the configurations of the super-resolution cut-off filters as super-resolution cutting off means, and FIGS. 7B and 7D show the distribution of the diameters of the main lobes obtained by respective configurations. The diameter W of the main lobe, which is called a diffraction-limited spot diameter, is normally the minimum spot diameter realizable, and has a distribution as shown in FIG. 7B when a laser beam 50 is incident on the objective lens 16 shown in FIG. 7A. However, when a light-blocking plate 40 is provided immediately before the objective lens 16 as shown in FIG. 7C whereby the amplitude distribution at the lens aperture surface is transformed so as to be small at the inward portion and large at the outward portion, the diameter of the main lobe of the focus spot can be made smaller than the normal diffraction-limited value thereby realizing a distribution as shown in FIG. 7D.

Referring to FIG. 8, there are provided a laser diode (wavelength: 780 nm) 12 for a CD and a half mirror 11 which is a beam splitter element for reflecting and guiding a laser beam to a collimating lens 13 and also for transmitting and making a reflected laser beam from a disk 18 incident on a photo-detector 90 corresponding to the wavelength of the laser diode for a CD. There is also provided a reflecting mirror 15 for guiding the laser beam which passed through the collimating lens 13 to an objective lens 16 or 17, by which the laser beam is convergently incident on the disk 18. The disk 18, either a DVD 18*a* or a CD 18*b*, is placed on a driving mechanism (not shown) and rotated thereby. The objective lens 16 has a high numerical aperture (high NA) for a DVD, and the objective lens 17 has a low numerical aperture (low NA) for a CD. The laser beam that passed through the collimating lens 13 is guided to one of the objective lenses 16 and 17, which correspond to the DVD 18*a* and the CD 18*b*, respectively. A super-resolution cut-off filter 10 is disposed immediately before the objective lens 16 so as to be combined therewith. When the DVD 18*a* is read, the objective lens 16 combined with the super-resolution cut-off filter 10 is arranged at an optical path, and when the CD 18*b* is read, the objective lens 17 alone is arranged at the optical path. The objective lens 16 combined with the super-resolution cutoff filter 10, and the objective lens 17 are integrally structured with a switching-over means (not shown) for interchanging the two objective lenses 16 and 17 for the DVD 18*a* and the CD 18*b*, respectively, and with an actuator driving system (not shown) for controlling their position relative to a recording surface of the disk 18. The laser beam reflected at the disk 18 travels backward along the incoming path, passes through the half mirror 11, is received by a photo-detector 90, and converted thereby into an electrical signal. The super-resolution cut-off filter 10 comprises a light-transmissible plate glass 33, and two anti-reflection films 31 made of a multi-layer and formed on the both side surface of the plate glass 33 such that one is formed entirely on one side surface and the other is formed partly on the other side surface, specifically, formed at portions except a central portion provided with a metal reflection film 32 whereby super-resolution effect is produced.

The apparatus shown in FIG. 8 operates as follows. When recording and reading on the DVD 18*a*, a laser beam emitted from the laser diode (wavelength: 780 nm) 12 appropriate for a CD is reflected at the half mirror 11 and incident on the collimating lens 13. The laser beam has its diffusion angle collimated by the collimating lens 13, has its optical path changed by the reflecting mirror 15, passes through the super-resolution filter, is converged into a beam spot with a predetermined diameter by the objective lens 16, and incident on a recording surface of the DVD 18*a*. In this instance, it is supposed that the objective lens 16 combined with the super-resolution cut-off filter 10 is selected in advance and set in place by the driving mechanism (not shown). The laser beam reflected at the recording surface of the DVD 18*a* travels backward along the incoming optical path, passes through the objective lens 16 and the super-resolution cut-off filter 10, has its optical path changed by the reflecting mirror 15, is converged by the collimating lens 13, passes through the half mirror 11, is incident on the photodetector 90, and converted into an electrical signal. When information is recorded on the DVD 18*a*, the intensity of the laser beam is increased to a predetermined value, and when recorded information is read, the intensity of the laser beam is decreased to a predetermined value. This is controlled by a control circuit and a laser driving circuit (both circuits not shown). When reading the CD 18*b*, it is supposed that the objective lens 17 is selected in advance and set in place by the driving mechanism (not shown). And, when information recorded on the CD is read, the intensity of the laser beam is adjusted to a predetermined value by the control circuit and the laser driving circuit (both circuits not shown).

However, the apparatus according to the second conventional example shown in FIG. 8 has the following problems. The super-resolution cut-off filter 10 is disposed before the objective lens 16 so that information can be read and recorded on two types of disks having respective recording densities different from each other using only one laser diode appropriate for a CD having a wavelength of 780 nm. The laser beam reflected at the DVD 18*a* takes the incoming optical path backward, passes through the objective lens 16 and the super-resolution cut-off filter 10, is incident on the reflecting mirror 15, and finally is incident on the photo-detector 90, to be converted thereby into an electrical signal. The super-resolution cut-off filter 10 limits the quantity of the laser beam to be incident on the center of the objective lens 16 thereby decreasing the diameter of the main lobe of a focus spot to be smaller than an ordinary diffraction-limited value. As described above, the laser beam reflected at the DVD 18*a* passes again, now backward, through the super-resolution cut-off filter 10. Accordingly, the reflected laser beam has its quantity limited and decreased at the center, resulting in decreased quantity of the laser beam incident on the photo-detector 90.

SUMMARY OF THE INVENTION

Accordingly, it is an object of the present invention to provide an optical pickup apparatus in which a reflected laser beam does not suffer loss of its quantity when passing backward through the super-resolution cut-off filter.

In order to achieve the above object, an optical pickup apparatus according to the present invention includes: a laser beam source; a laser beam selecting means adapted to selectively pass and block a laser beam in accordance with a polarization plane of the laser beam; an objective lens; a polarization plane rotating means provided between the laser beam selecting means and the objective lens, and adapted to rotate a polarization plane; and a photo-detector adapted to detect a reflected laser beam from two types of disks having respective recording densities different from each other.

In the apparatus according to the present invention, preferably, the laser beam selecting means is a super-resolution cut-off filter, which comprises a light transmissible substrate, and a polarizing filter film made of a dielectric multi-layer, formed at a central portion of a side surface of the light-transmissible substrate, and adapted to selectively pass and block a laser beam in accordance with a polarization plane of the laser beam.

In the apparatus according to the present invention, preferably, the polarization plane rotating means is a λ/4 phase plate.

In the apparatus according to the present invention, preferably, the polarization plane rotating means is formed directly on a side surface of the light-transmissible substrate opposite to the side surface having the polarizing filter layer formed thereon, thereby being integrated with the super-resolution cut-off filter.

BRIEF DESCRIPTION OF THE DRAWINGS

FIGS. 6A to 6C relate to a wavelength selection prism, wherein FIGS. 6A and 6B show its operation and FIG. 6C shows its characteristic;

FIGS. 7A to 7D are explanatory drawings illustrating the relation between the configuration of a super-resolution cut-off filter as a super-resolution cutting-off means and the diameter of a main lobe of a focus spot, wherein FIGS. 7A and 7C show the distributions of super-resolution cut-off filters, and FIGS. 7B and 7D show the distribution of the main lobe diameters obtained by the super-resolution cut-off filters shown in FIGS. 7A and 7B, respectively.

DESCRIPTION OF THE PREFERRED EMBODIMENTS

Figure 1:
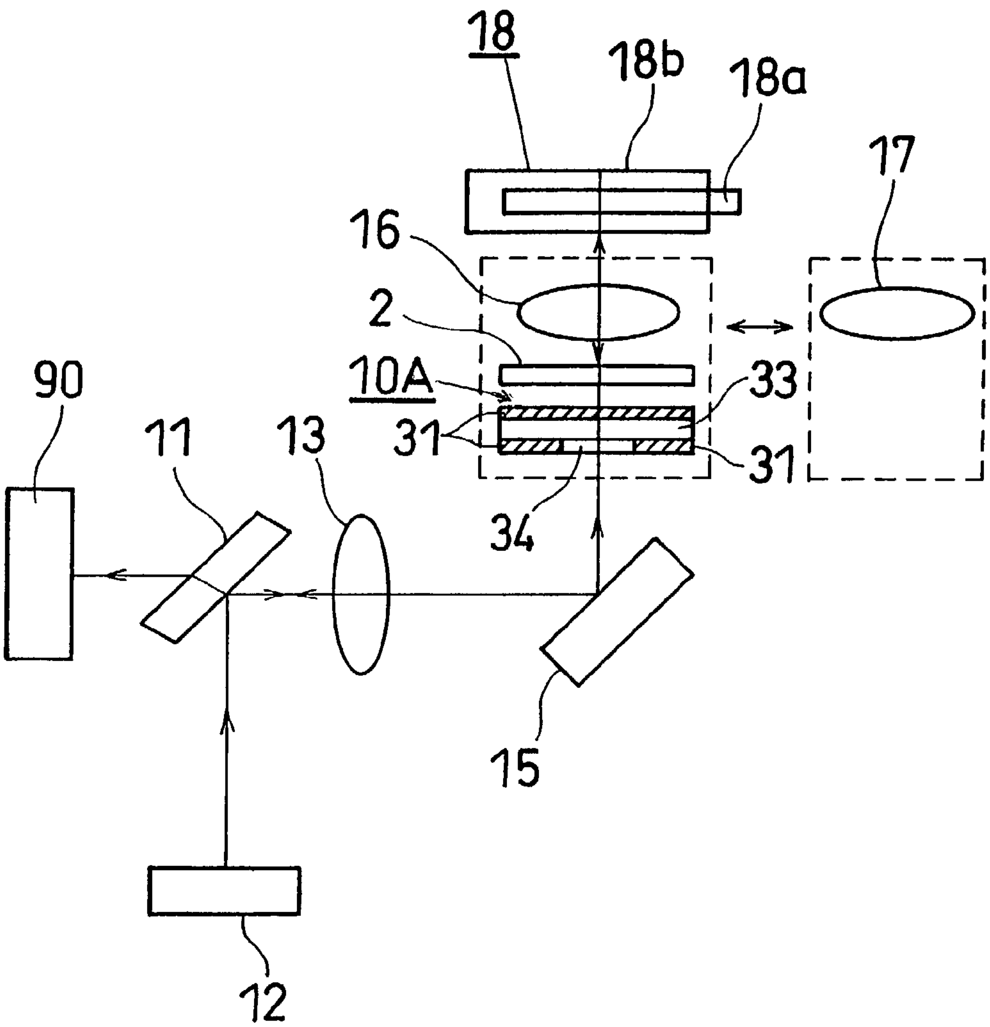
FIG. 1 is a block diagram of an optical pickup apparatus of the present invention.
Figure 8:
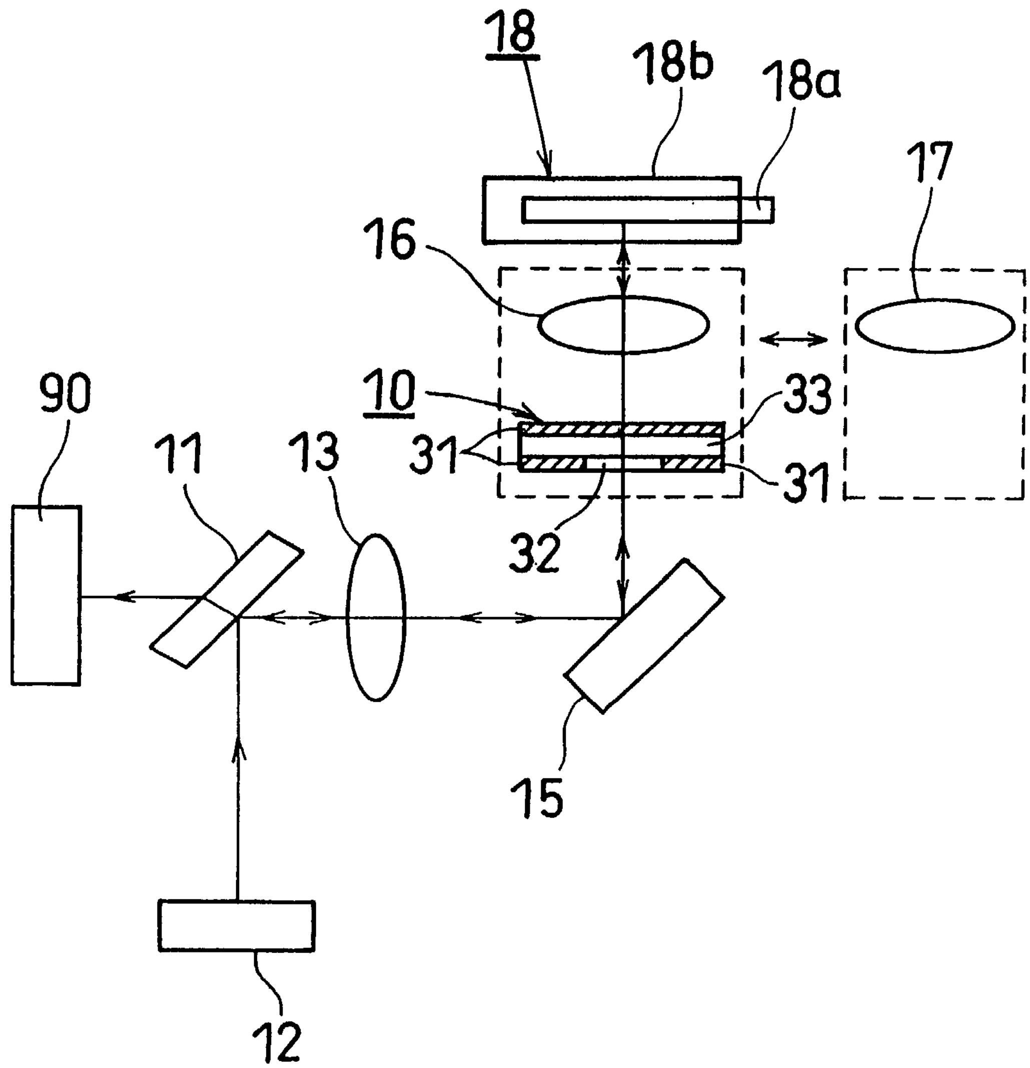
FIG. 8 is a block diagram of a second conventional example.

The present will be described with reference to FIGS. 1 through 4. In FIG. 1, the same elements as those in FIG. 8 are denoted by the same reference numerals.

Referring to FIG. 1, there are provided a laser diode (wavelength: 780 nm) 12 appropriate to a CD, a super-resolution cut-off filter 10A, and a polarization plane rotating means 2 disposed between the super-resolution cut-off filter 10A and an objective lens 16 corresponding to a DVD 18*a* with high density. With such a configuration, a laser beam reflected at the DVD 18*a* is not blocked by the super-resolution cut-off filter 10A. Consequently, the reflected laser beam from the disk can be kept from suffering loss at the super-resolution cut-off filter 10A, and micro pit information on a disk with a high recording density such as a DVD can be read using only the laser diode 12 with a wavelength of 780 nm appropriate for a CD.

There is further provided a half mirror 11 serving as a beam splitter element. The half mirror 11 reflects and guides a laser beam to a collimating lens 13 and also transmits and guides a reflected laser beam from a disk 18 to a photo-detector 90 corresponding to the wavelength of the laser diode 12 for a CD. Also, there is provided a reflecting mirror 15 for reflecting and guiding the laser beam that has passed through the collimating lens 13 to the objective lens 16 or 17 which converges the laser beam onto the disk 18. The disk 18, either the DVD 18*a* or a CD 18*b*, is placed on a driving mechanism (not shown) and rotated thereby.

The objective lens 16 has a high numerical aperture (high NA) for a DVD, and the objective lens 17 has a low numerical aperture (low NA) for a CD. The polarization plane rotating means 2 is disposed after the super-resolution cut-off filter 10A and before the objective lens 16. The polarization plane rotating means 2 is a λ/4 phase plate. When the DVD 18*a* is read, the objective lens 16, the polarization plane rotating means 2 and the super-resolution cut-off filter 10 are set, as a unit, in place at the optical path. When the CD 18*b* is read, the objective lens 17 alone is set in place at the optical path with the objective lens 16, the polarization plane rotating means 2 and the super-resolution cut-off filter 10A displaced out of the optical path. The objective lens 16, the polarization plane rotating means 2 and the super-resolution cut-off filter 10A, and the objective lens 17 are integrally structured with a switching-over means (not shown) for interchanging the two objective lenses 16 and 17 for the DVD 18*a* and the CD 18*b*, respectively, and with an actuator driving system (not shown) for controlling their position relative to a recording surface of the disk 18. The laser beam reflected at the disk 18 travels backward along the incoming optical path, passes through the half mirror 11, is received by the photo-detector 90, and converted thereby into an electrical signal.

In the optical pickup apparatus shown in FIG. 1, the laser beam has its polarization plane set to be S-polarized. The S-polarized laser beam has the same polarization plane as a polarized laser beam blocked by a polarizing filter film 34 formed on the super-resolution cut-off filter 10A to be detailed below.

Figure 2:
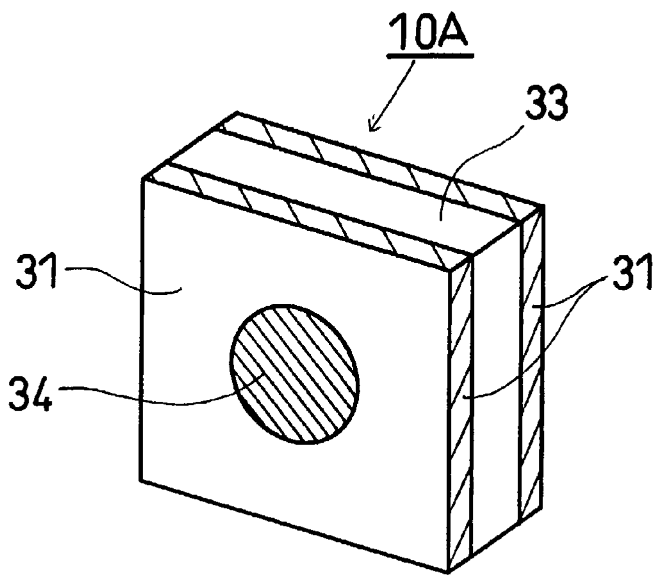
FIG. 2 is a perspective view showing a first embodiment of a super-resolution cut-off filter according to the present invention.

A first embodiment of a super-resolution cut-off filter according to the present invention, that is the aforementioned super-resolution cut-off filter 10A will be described in detail referring to FIG. 2. In FIG. 2, the super-resolution cut-off filter 10A comprises a light-transmissible substrate 33, for example a parallel glass plate, and two anti-reflection films 31 made of a dielectric multi-layer and formed on both side surfaces of the substrate 33, respectively, such that one is formed partly on one side surface, specifically, formed at portions except the center portion, where the aforementioned polarizing filter film 34 is formed, which is a circular dielectric multi-layer made of $SiO_2$, $TiO_2$, and the like alternately evaporated, and the other is formed entirely on the other side surface. This structure gives an advantage that the polarizing filter film 34 and the anti-reflection films 31 can be produced by the same production equipment (film-forming apparatus). The super-resolution cut-off filter 10A uses the polarizing filter film 34, and is adapted to reduce the diameter of a spot converged by the objective lens 16 to be smaller than an ordinary diffraction-limited value. The polarizing filter film 34 is made of a dielectric multi-layer having a light transmittance characteristic shown in FIG. 3.

Figure 3:
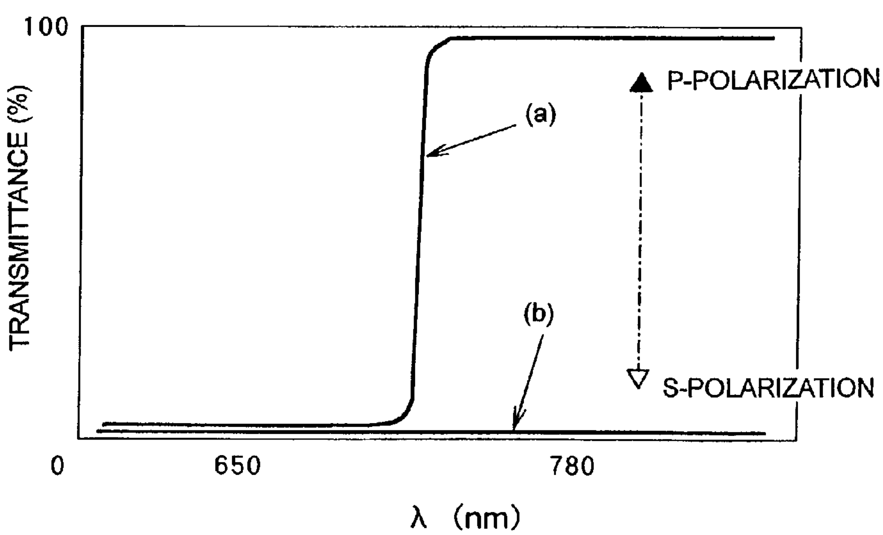
FIG. 3 is a graph illustrating characteristics of a polarizing filter layer of the super-resolution cut-off filter according to the present invention.

Referring to FIG. 3, the abscissa represents the wavelength of a laser beam and the ordinate represents the transmittance of light. The polarizing filter film 34 has, at a wavelength of 780 nm of the laser diode 12, substantially zero transmittance for an S-polarized laser beam (line (b)) and substantially 100% transmittance for a P-polarized laser beam (line (a)) as shown in the figure.

The optical pickup apparatus shown in FIG. 1 operates as follows. When recording and reading on the DVD 18*a*, it is supposed that the objective lens 16, the polarization plane rotating means 2 and the super-resolution cut-off filter 10A in combination as a unit are selected and set in place in advance by the driving mechanism (not shown).

A laser beam emitted from the laser diode 12 has its polarization plane set to be S-polarized. The S-polarized laser beam is reflected at the half mirror 11, incident on the collimating lens 13, has its diffusion angle collimated by the collimating lens 13, has its optical path changed by the reflecting mirror 15, and is incident on the super-resolution cut-off filter 10.A The polarizing filter film 34 formed on the super-resolution cut-off filter 10A has substantially zero transmittance for S-polarized light as shown in FIG. 3, and so exhibits super-resolution effect for the incident S-polarized laser beam acting as a super-resolution cut-off filter.

Figure 7A:
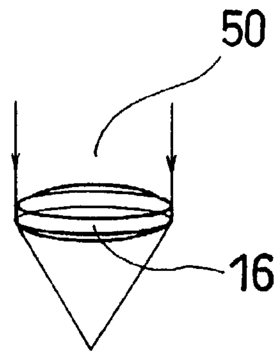
Figure 7B:
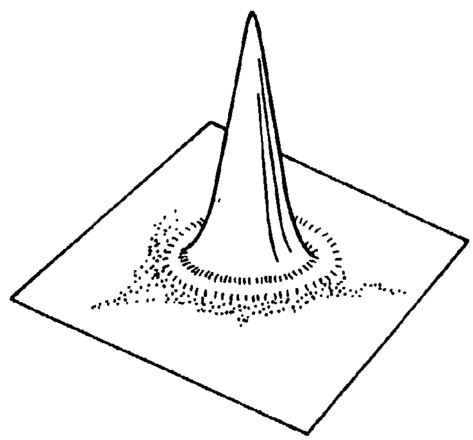
Figure 7C:
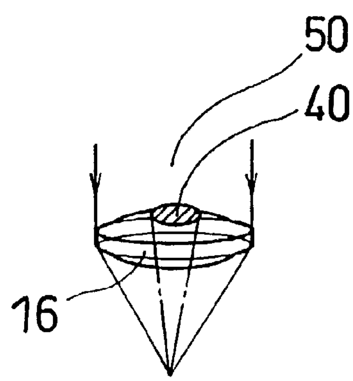
Figure 7D:
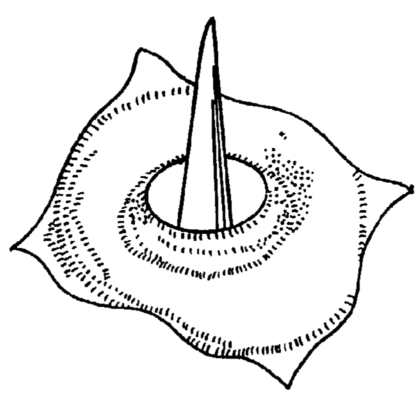

The diameter of the main lobe of a focus spot can be smaller than an ordinary diffraction-limited value by the super-resolution cut-off filter 10A having the polarizing filter film 34 formed thereon and the S-polarized laser beam, thereby rendering the distribution shown in FIG. 7D. The S-polarized laser beam having passed through the super-resolution cut-off filter 10A has its phase shifted by 90 degrees while passing through a λ/4 phase plate (the polarization plane rotating means 2). The laser beam with a phase difference of 90 degrees (circularly-polarized light) is converged into a laser beam with the aforementioned diameter by the objective lens 16, is incident on the recording surface of the DVD 18*a*, and reflected thereat. The reflected laser beam passes backward through the λ/4 phase plate, thereby having its phase shifted further by 90 degrees constituting a linearly-polarized light. That is, the reflected laser beam having passed backward through the λ/4 phase plate has its polarization plate rotated by 90 degrees relative to the incoming S-polarized laser beam incident on the super-resolution cut-off filter 10A, and thereby turns into a P-polarized laser beam.

Since the polarizing filter film 34 formed on the super-resolution cut-off filter 10A has substantially 100% transmittance for a P-polarized laser beam as shown in FIG. 3, the reflected laser beam, which has turned into a P-polarized laser beam, is not reduced by the super-resolution cut-off filter 10A. The reflected laser beam passes through the super-resolution cut-off filter 10A without reduction, has its optical path changed by the reflecting mirror 15, passes through the collimating lens 13 and the half mirror 11, is incident on the photo-detector 90, and converted thereby into an electrical signal. When information is recorded on the DVD 18*a*, the intensity of the laser beam is increased to a predetermined value, and when the recorded information is read, the intensity of the laser beam is decreased to a predetermined value. This is controlled by a control circuit and a laser driving circuit (both circuits not shown).

When reading on the CD 18*b*, it is supposed that the objective lens 17 for a CD alone is selected and set in plane in advance by the driving mechanism (not shown) instead of the combination unit of the super-resolution cut-off filter 10A, the polarization plane rotating means 2 and the objective lens 16, and when the CD is read, the intensity of the laser beam is controlled to a predetermined value by the control circuit and the laser driving circuit (both not shown).

Figure 4:
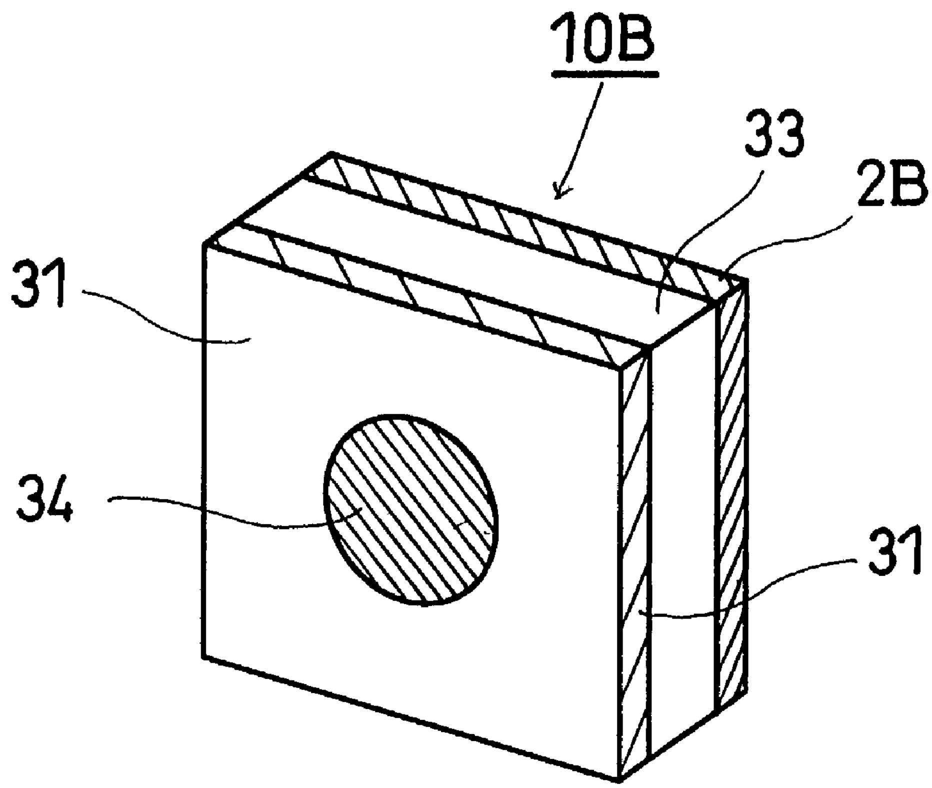
FIG. 4 is a perspective view showing a second embodiment of the super-resolution cut-off filter according to the present invention.
Figure 5:
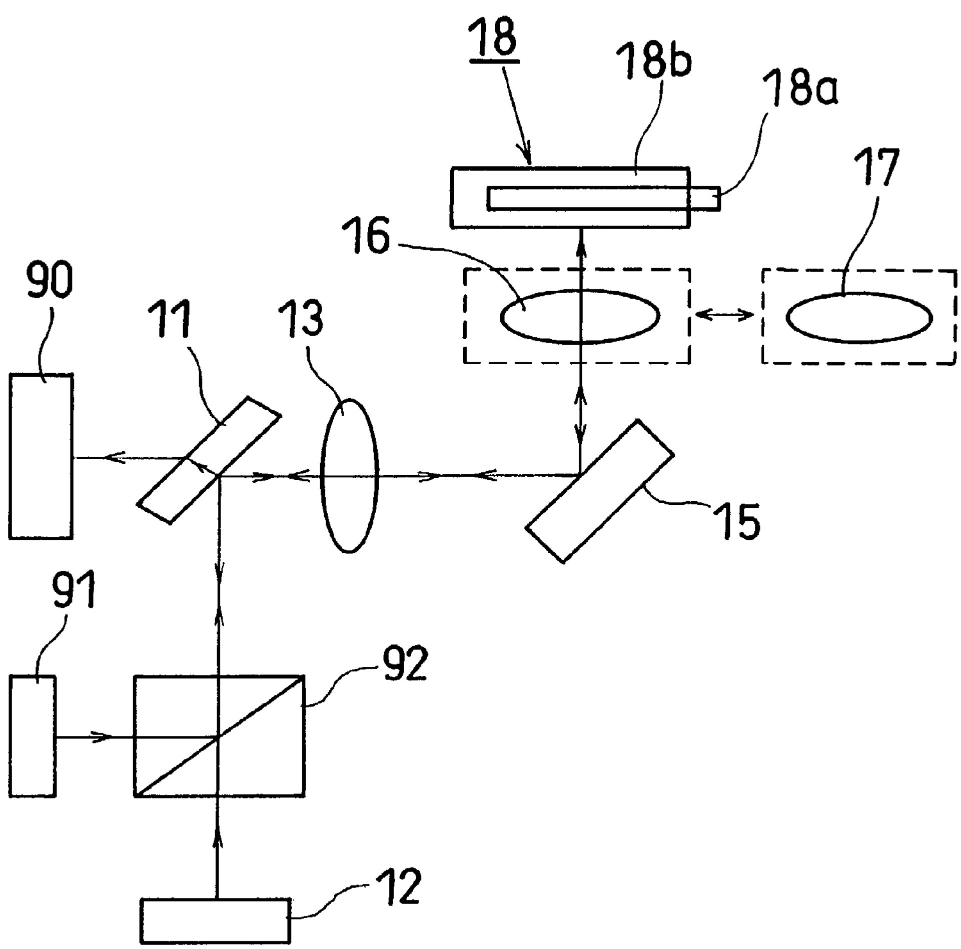
FIG. 5 is a block diagram of a first conventional example.
Figure 6A:
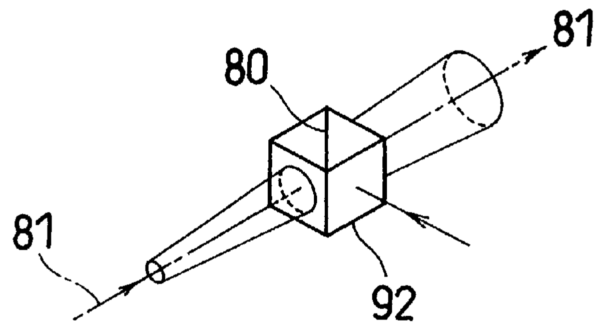
Figure 6B:
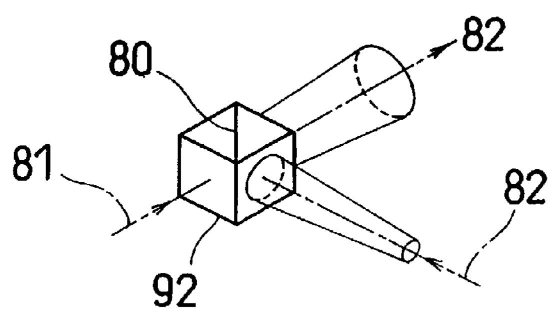
Figure 6C:
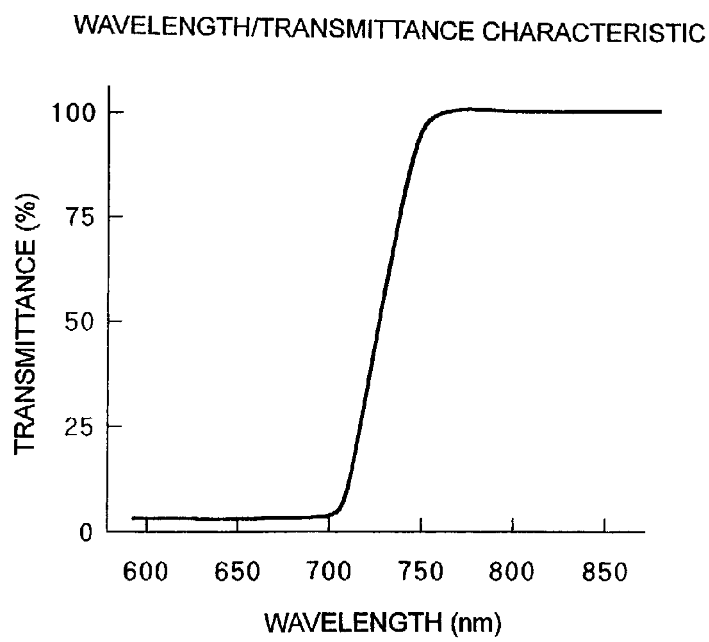

A second embodiment of a super-resolution cut-off filter according to the present invention will be described referring to FIG. 4. In FIG. 4, a super-resolution cut-off filter 10B comprises: a light-transmissible substrate 33, for example a parallel glass plate; an anti-reflection film 31 (same as the filter 10) formed partly on one side surface of the substrate, specifically, formed at portions except the center portion, where a polarizing filter film 34 (same as the filter 10A) is formed; and a λ/4 phase plate 2B made of a dielectric multi-layer and formed entirely on the other side surface of the substrate 33. With such a configuration, the super-resolution cut-off filter 10B reduces the diameter of a laser beam spot converged by the objective lens 16 to be smaller than an ordinary diffraction-limited value, as will be described later. Since the λ/4 phase plate 2B is made of a dielectric multi-layer, the anti-reflection film 31, the polarizing filter film 34, and the λ/4 phase plate 2B can be produced by the same production equipment (film-forming apparatus). Also, since the super-resolution cut-off filter 10B integrally includes the λ/4 phase plate 2B functioning as the polarization plane rotating means 2, the polarization plane rotating means 2 does not have to be provided separately. The second embodiment operates similarly to the first embodiment shown in FIG. 3, and its description will be omitted. A λ/4 phase plate made of a birefringent optical crystal such as quartz may substitute for the substrate 33, and the polarization plane filter film 34 and the anti-reflection film 31 may be formed on the side surface thereof.

The optical pickup apparatus according to the present invention is described above as adapted compatibly for two types of disks having respective recording densities different from each other, but may be applied as an apparatus intended solely for a high-density disk.

The optical pickup apparatus according to the present invention includes one laser diode, the super-resolution cut-off filter disposed before the objective lens for a DVD with a high recording density, and the polarization plane rotating means disposed between the super-resolution cut-off filter and the objective lens, whereby a laser beam reflected at the DVD is not blocked by the super-resolution cut-off filter. Consequently, the reflected laser beam from the disk does not suffer loss at the super-resolution cut-off filter and micro pit information of, for example, a DVD with a high recording density can be read using only one laser diode with a wavelength of 780 nm adapted for a CD.

In the apparatus according to the present invention, since the laser beam selecting means is a super-resolution cut-off filter having a polarizing filter layer made of a dielectric multi-layer to selectively pass and block a laser beam in accordance with a polarization plane of the laser beam and formed on a central portion of a translucent substrate thereof, and since the polarization plane rotating means is a λ/4 phase plate, the loss of the reflected laser beam from the disk at the super-resolution cut-off filter can be eliminated with a simple configuration.

In the apparatus according to the present invention, since the super-resolution cut-off filter and the polarization plane rotating means are integrally formed with each other, the polarization plane rotating means does not have to be provided separately, thereby largely contributing in cost reduction and downsizing.

What is claimed is:

1. An optical pickup apparatus for reading and recording information on a recording medium, the apparatus comprising:

a laser beam source;

a laser beam selecting means adapted to selectively pass and block a laser beam in accordance with a polarization plane of the laser beam;

an objective lens;

a polarization plane rotating means disposed between the laser beam selecting means and the objective lens, and adapted to rotate a polarization plane; and a photo-detector adapted to detect a reflected laser beam from two types of recording media having respective recording densities different from each other, wherein the laser beam selecting means is a super-resolution cut-off filter comprising a light-transmissible substrate, and a polarizing filter film made of a dielectric multi-layer, formed at a central portion of a side surface of the light-transmissible substrate, and adapted to selectively pass and block a laser beam in accordance with a polarization plane of the laser beam.

2. An optical pickup apparatus according to claim 1, wherein the polarization plane rotating means is a λ/4 phase plate.

3. An optical pickup apparatus according to claim 1, wherein the polarization plane rotating means is integrated with the super-resolution cut-off filter by being formed directly on a side surface of the light-transmissible substrate opposite to the side surface having the polarizing filter film formed at the central portion thereof.

4. An optical pickup apparatus according to claim 1, wherein the polarization plane rotating means is a λ/4 phase plate.

5. An optical pickup apparatus according to claim 2, wherein the polarization plane rotating means is integrated with the super-resolution cut-off filter by being formed directly on a side surface of the light-transmissible substrate opposite to the side surface having the polarizing filter film formed at the central portion thereof.

* * * * *